United States Patent [19]

Kaku et al.

[11] 4,380,729

[45] Apr. 19, 1983

[54] SWITCHING REGULATOR

[75] Inventors: Masaro Kaku, Ebina; Yasumasa Sawaki; Kunio Ando, both of Yokohama, all of Japan

[73] Assignee: Hitachi, Ltd., Tokyo, Japan

[21] Appl. No.: 275,256

[22] Filed: Jun. 19, 1981

[30] Foreign Application Priority Data

Jun. 19, 1980 [JP] Japan .................................. 55-82165

[51] Int. Cl.$^3$ .............................................. G05F 1/46
[52] U.S. Cl. .................................... 323/285; 323/290
[58] Field of Search ............... 323/299, 282, 284, 285, 323/286, 287, 290; 363/21, 39-40

[56] References Cited

U.S. PATENT DOCUMENTS 3,378,758  4/1968  Goodenow .......................... 323/289
3,676,800  7/1972  Weischedel et al. ........... 323/285 X

FOREIGN PATENT DOCUMENTS 681423  8/1979  U.S.S.R. ............................. 323/285

*Primary Examiner*—William M. Shoop
*Assistant Examiner*—Peter S. Wong
*Attorney, Agent, or Firm*—Antonelli, Terry & Wands

[57] ABSTRACT

A switching regulator which chops an unstabilized D.C. input voltage by a switching transistor and rectifies the chopped voltage to produce a stabilized D.C. output voltage is disclosed. A series circuit of a resistor, a capacitor and a coil is inserted between a stabilized D.C. output terminal and a base electrode of an exciting transistor which excites the switching transistor to suppress the increase of a ripple voltage produced when the unstabilized D.C. input voltage drops.

6 Claims, 5 Drawing Figures

SWITCHING REGULATOR

FIELD OF THE INVENTION

The present invention relates to an improvement in a falling voltage characteristic and a rising characteristic of an output voltage at the time of power-on in a switching regulator.

DESCRIPTION OF THE PRIOR ART

FIG. 1 shows a circuit diagram of a prior art step-down type switching regulator. Such a system is shown, for example, by the U.S. Pat. No. 4,118,739.

In FIG. 1, numeral 1 denotes a terminal to which an unstabilized D.C. voltage derived by rectifying and smoothing an A.C. input voltage is applied. The voltage applied thereto is converted to a stabilized output voltage at a terminal 4 by controlling a conduction period of a switching transistor 2 by a control circuit to be described later. The conduction period of the switching transistor 2 is controlled by controlling a duty factor of an exciting transistor 13 which excites the switching transistor 2 by an output of a voltage-pulse width conversion circuit 14, which in turn is controlled by dividing the output voltage appearing at the terminal 4 by a series circuit of resistors 9 and 10, comparing the divided voltage (voltage at a node A) with a reference voltage (voltage at a node B) derived from a stabilized voltage souce 16, a resistor 17 and a zener diode 19, by an error detecting transistor 18 and using the resulting error voltage as a control signal. That is, it is controlled to reduce the error voltage. In the control operation, the output pulse width of the voltage-pulse width conversion circuit 14 is controlled such that the conduction period of the switching transistor 2 is shortened (or lengthened) as the unstabilized D.C. voltage rises (or falls).

In FIG. 1, numeral 3 denotes a choke coil, numeral 5 denotes a start circuit, 6 denotes a capacitor, 7 denotes a resistor, 8 denotes an exciting transformer, 11 denotes a smoothing capacitor, 12 denotes a flywheel diode and 15 denotes a terminal to which a pulse waveform for determining a switching period is applied.

The control described above is effective only when the unstabilized D.C. voltage is higher than the output voltage. When the A.C. input voltage varies so that the unstabilized D.C. voltage falls below a controllable range, a base voltage of the error detecting transistor 18 falls below an emitter voltage thereof (voltage at the node B) so that the error detecting transistor 18 is cut off to disable the error detector. As a result, the conductor period of the switching transistor 2 does not properly follow the change in the output voltage and a ripple in the output voltage increases. As the unstabilized D.C. voltage falls, the ripple in the output voltage increases as shown by 29 in FIG. 5. When such a switching regulator is used as a power supply for a color television receiver, a displayed image materially swings by the ripple as the A.C. input voltage falls. FIG. 5 shows an input-output characteristic for the A.C. input voltage (horizontal axis) and the ripple voltage in the output voltage (vertical axis).

FIG. 2 shows a circuit diagram of a switching regulator which overcomes the difficulty described above.

In FIG. 2, a series circuit of resistors 20 and 21 is connected between a terminal 1 and ground E and a resistor 17 is connected to the junction C of the resistors 20 and 21. The other end of the resistor 17 is connected to a junction B of a cathode of a zener diode 19 and an emitter of an error detecting transistor 18. A capacitor 22 is provided to smooth the voltage derived by the resistors 20 and 21, that is, the voltage at the node C. A difference from the circuit of FIG. 1 resides in reference voltage producing means. In the circuit of FIG. 1, the reference voltage is derived from the stabilized voltage source 16 while in the circuit of FIG. 2 it is derived by dividing the unstabilized D.C. voltage. Accordingly, in the circuit of FIG. 2, when the unstabilized D.C. voltage drops so that the voltage at the junction of the resistors 20 and 21 (the voltage at the node C) falls below the cathode voltage of the zener diode 19, the zener diode 19 is cut off but the reference voltage (the voltage at the node B) applied to the emitter of the transistor 18 drops as the unstabilized D.C. voltage drops. Accordingly, in the circuit of FIG. 2, when the unstabilized D.C. voltage drops below the controllable range, the reference voltage also drops as described above so that the error detecting transistor 18 is not cut off as is done in the circuit of FIG. 1. Consequently, even if the unstabilized D.C. voltage drops, the ripple does not materially increase.

However, this circuit has the following disadvantage. Since the voltage to be applied to the zener diode 19 is derived from the unstabilized D.C. voltage, the change in the unstabilized D.C. voltage is conveyed to the zener diode 19 through the resistors 20 and 17 even when the unstabilized D.C. voltage is within the controllable range. As a result, the reference voltage changes slightly and the stability of the reference voltage is lowered in comparison with the circuit of FIG. 1. Accordingly, the control characteristic for the A.C. input voltage versus the output voltage has a large variation beyond a preset output voltage (shown by an arrow 24 in FIG. 3). FIG. 3 shows an input-output characteristic for the A.C. input voltage (horizontal axis) and the D.C. output voltage (vertical axis).

In general, since the switching regulator has a slow rise in a power supply voltage, when it is used as a power supply for a color television receiver, a high voltage power supply of the color television receiver rises faster. This is not desirable from safety standpoint.

SUMMARY OF THE INVENTION

It is an object of the present invention to provide a switching regulator which overcomes the difficulties encountered in the prior art switching regulator and which has an improved falling voltage characteristic and an improved rising characteristic of a power supply voltage.

In order to achieve the above object, according to the present invention, a series circuit of a coil, a capacitor and a resistor is connected between the output voltage terminal and the base of the exciting transistor of the control circuit in the switching regulator shown in FIG. 1.

Objects, features and advantages of the present invention will become apparent from the following detail description of a preferred embodiment thereof taken in conjunction with accompanying drawings, in which:

DETAILED DESCRIPTION OF THE PREFERRED EMBODIMENTS

Referring now to the accompanying drawings, one embodiment of the present invention will be explained.

Figure 1:
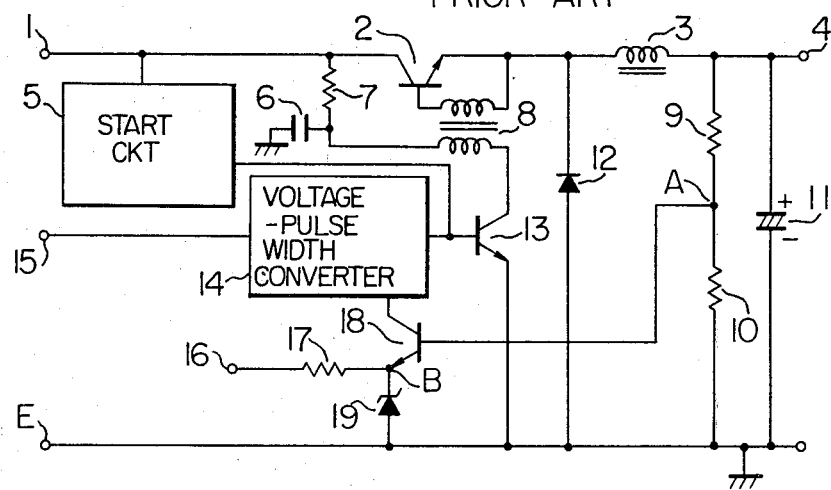
FIG. 1 shows a circuit diagram of a prior art switching regulator.
Figure 2:
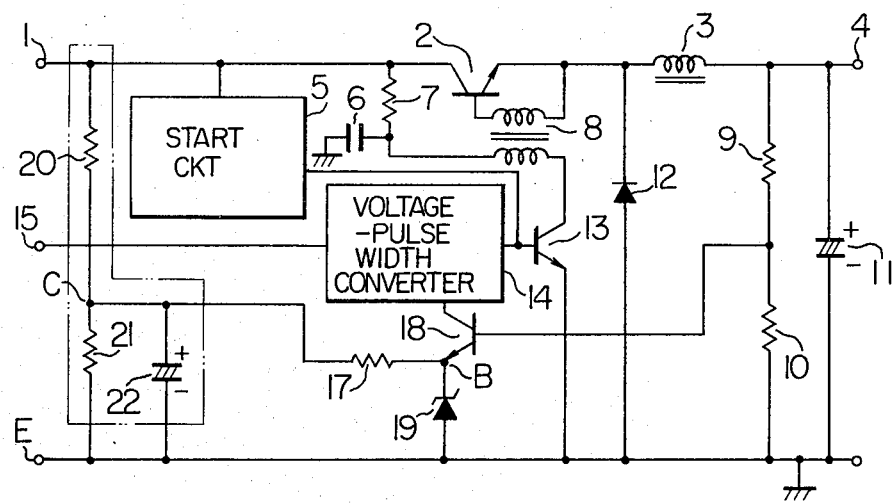
FIG. 2 shows a circuit diagram of an improvement over the switching regulator shown in FIG. 1.
Figure 4:
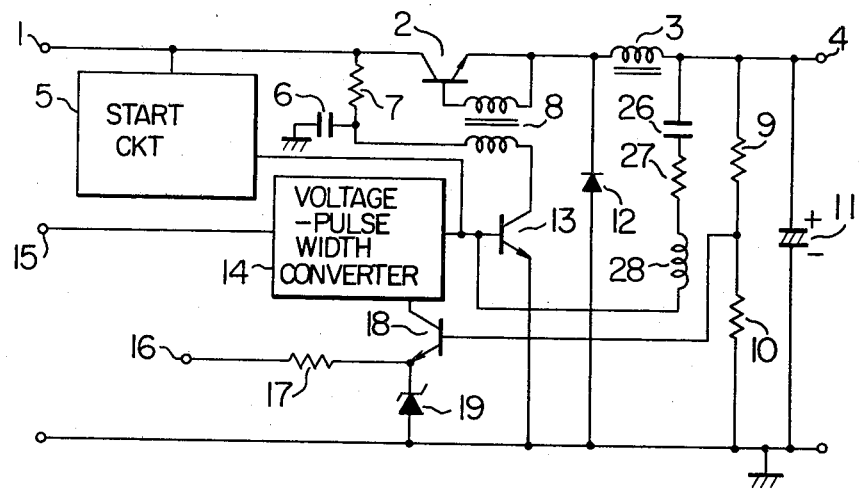
FIG. 4 shows a circuit diagram of one embodiment of the present invention.

FIG. 4 shows a circuit diagram of one embodiment of the present invention. In FIG. 4, a series circuit of a capacitor 26, a resistor 27 and a coil 28 is added in accordance with the present invention. The like numerals to those shown in the circuit of FIG. 1 denote the elements of like function. In the present embodiment, the series circuit of the capacitor 26, resistor 27 and coil 28 has one end thereof connected the output voltage terminal 4 and the other end thereof connected to the base of the exciting transistor 13. The capacitor 26 functions to convey the change in the voltage at the output voltage terminal 4 to the base of the exciting transistor 13 and the coil 28 is connected in series with the capacitor 26 and serves to eliminate noises in high frequency components (e.g. horizontal ripple) appearing at the output voltage terminal 4. The resistor 27 serves to damp a series resonance caused by the capacitor 26 and the coil 28.

Figure 3:
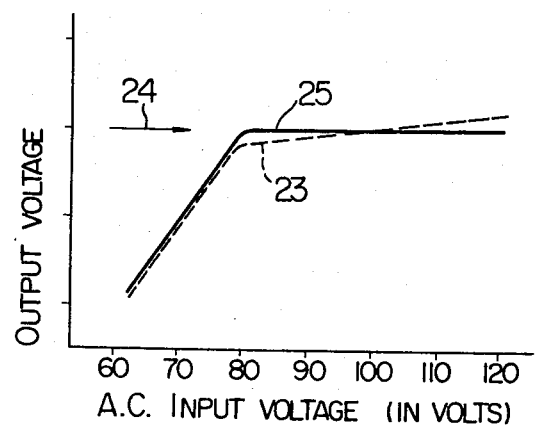
FIG. 3 shows a control characteristic for an output voltage in the switching regulator.
Figure 5:
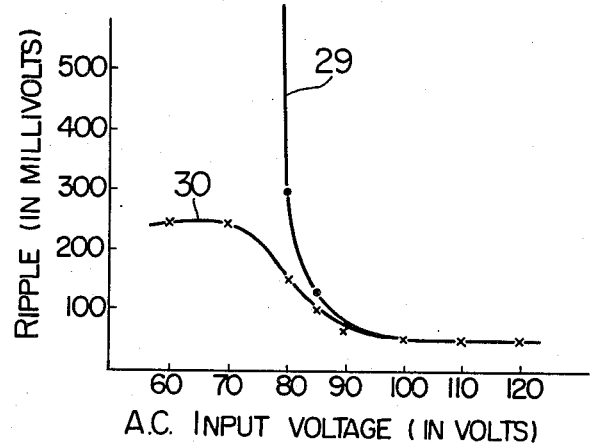
FIG. 5 shows characteristic curves of the prior art and the embodiment of the present invention.

When the exciting transistor 13 and the switching transistor 2 are of opposite phase relation to each other (that is, when the exciting transistor 13 is ON, the switching transistor 2 if OFF), and if the output voltage rises, the change in the output voltage is conveyed to the base of the exciting transistor 13 through the series circuit so that the conduction period of the exciting transistor 13 is increased. Since the exciting transistor 13 is of opposite phase relation to the switching transistor 2, the conduction period of the switching transistor 2 decreases and the output voltage drops. As the output voltage drops, the base voltage of the exciting transistor 13 decrease and hence the conduction period of the exciting transistor 13 decreases while the conduction period of the switching transistor 2 increases resulting in the rise in the output voltage. Accordingly, the ripple in the output voltage is fed back to the base of the exciting transistor 13 through the series circuit. Let us assume that the unstabilized D.C. voltage applied to the terminal 1 falls below a preset output voltage. Without the series circuit as is the case of FIG. 1, the ripple in the output voltage increases as the unstabilized D.C. voltage (or A.C. input voltage) falls as shown by 29 in FIG. 5. With the series circuit as is the case of the present embodiment, when the error detecting transistor 18 is cut off as the unstabilized D.C. voltage falls, the ripple in the output voltage increases but the ripple voltage is fed back to the base of the exciting transistor 13 through the series circuit so that the conduction period of the switching transistor 2 is controlled to suppress the increase of the ripple of the output voltage. As a result, as shown by a curve 30 in FIG. 5, the increase of the ripple of the output voltage is appreciably suppressed even when the unstabilized D.C. voltage falls. Furthermore, since the reference voltage is derived by supplying voltage to the zener diode 19 from the stabilized voltage source 16 through the resistor 17, the control characteristic for the A.C. input voltage versus the output voltage does not substantially change beyond a preset output voltage (shown by the arrow 24 in FIG. 3) as shown by a curve 25 in FIG. 3.

Since the series circuit of the present embodiment functions to drop the output voltage as the output voltage rises, it is also effective to slow the rise of the power supply voltage. The rise time is primarily determined by the capacitance of the capacitor 26.

The circuit constants of the capacitor 26, the resistor 27 and the coil 28 may be 1 μF, 560 Ω and 3.3 mH, respectively, for example. The resulting falling voltage characteristic is shown by a curve 30 in FIG. 5 and the rising characteristic of the output voltage is approximately 200~300 milliseconds.

As described hereinabove, according to the present invention, the falling voltage characteristics and the rising characteristic of the power supply voltage of the switching regulator can be improved by merely adding the three elements, the coil, the capacitor and the resistor to the prior art switching regulator.

What is claimed is:

1. A switching regulator comprising:
    (a) a D.C. input terminal across which and a common terminal an unstabilized D.C. voltage is applied,
    (b) a switching element having a control input terminal, an output terminal and an input terminal connected to said D.C. terminal,
    (c) a D.C. output terminal across which and said common terminal a stabilized D.C. voltage is produced,
    (d) a rectifying filter circuit having an input terminal connected to said output terminal of said switching element and an output terminal connected to said D.C. output terminal for rectifying a voltage chopped by said switching element,
    (e) a control circuit having an input terminal across which and said common terminal a switching pulse is applied, a control input terminal coupled to said D.C. output terminal and an output terminal for providing a control output signal, for varying a pulse width of said switching pulse in accordance with a change in the voltage at said D.C. output terminal to produce said control output signal,
    (f) an exciting transistor having a base electrode coupled to said output terminal of said control circuit, a collector electrode coupled to said control input terminal of said switching element and an emitter electrode coupled to said common terminal, and
    (g) a voltage feedback circuit connected between said D.C. output terminal and said base electrode of said exciting transistor, said voltage feedback circuit comprising a series circuit of a capacitive element, a resistive element and a reactive element connected in series between the D.C. output terminal and the exciting transistor base electrode.

2. A switching regulator according to claim 1 wherein said switching element comprises a transistor having a base electrode as said control input terminal, a collector electrode as said input terminal and an emitter electrode as said output terminal.

3. A switching regulator comprising:
    (a) a D.C. input terminal across which and a common terminal an unstabilized D.C. voltage is applied,
    (b) a switching element having a control input terminal, an output terminal and an input terminal connected to said D.C. input terminal,
    (c) a D.C. output terminal across which and said common terminal a stabilized D.C. voltage is produced, (d) a rectifying filter circuit having an input terminal connected to said output terminal of said switching element and an output terminal connected to said D.C. output terminal for rectifying a voltage chopped by said switching element, (e) a control circuit having an input terminal across which and said common terminal a switching pulse is applied, a control input terminal coupled to said D.C. output terminal and an output terminal for providing a control output signal, for varying a pulse width of said switching pulse in accordance with a change in the voltage at said D.C. output terminal to produce said control output signal, (f) an exciting transistor having a base electrode coupled to said output terminal of said control circuit, a collector electrode coupled to said control input terminal of said switching element and an emitter electrode coupled to said common terminal, and (g) a voltage feedback circuit connected between said D.C. ouput terminal and said base electrode of said exciting transistor to feed back to said base electrode a ripple voltage which develops in the stabilized D.C. voltage at said output terminal when said unstabilized D.C. voltage at said input terminal falls below a preset voltage in order to suppress an increase in said ripple voltage, wherein said voltage feedback circuit comprises a series circuit of a capacitive element, a resistive element and a reactive element connected in series between the D.C. output terminal and the exciting transistor base electrode.

4. A switching regulator according to claim 3, wherein said switching element comprises a transistor having a base electrode as said control input terminal, a collector electrode as said input terminal and an emitter electrode as said output terminal.

5. A switching regulator according to claim 1 or 3, wherein said control input terminal of said control circuit is coupled to said D.C. output terminal through a voltage divider and an error detecting transistor, said error detecting transistor being coupled to receive a divided stabilized D.C. output voltage from said voltage divider and to receive a stabilized reference voltage to provide an error detection signal to said control circuit based on the difference between said divided stabilized D.C. output voltage and said stabilized reference voltage.

6. A switching regulator according to claim 5, wherein the circuit parameters of said series circuit are set to permit continued feedback through said series circuit from said D.C. output terminal to said base electrode of said exciting transistor when the unstabilized D.C. input voltage drops to a level at which said error detecting transistor becomes cut-off.

* * * * *